June 5, 1951  N. A. NELSON  2,555,987

TRACTOR HITCH

Filed Feb. 21, 1947

INVENTOR.
NORAL A. NELSON

BY

ATTORNEYS

Patented June 5, 1951

2,555,987

UNITED STATES PATENT OFFICE 2,555,987

TRACTOR HITCH

Noral A. Nelson, Royal Oak, Mich., assignor to Harry Ferguson, Inc., Detroit, Mich., a corporation of Delaware Application February 21, 1947, Serial No. 730,105

20 Claims. (Cl. 280—33.44)

The present invention pertains to hitches for use with tractors and more particularly to hitches of the self-engaging type suitable for use with forwardly overbalanced implements.

Attempts have been made in the past to develop a satisfactory self-engaging hitch, that is, a hitch in which coupling is effected by elevation of a power-elevated draft link or the like into engagement with an implement tongue. While the resulting hitches have been useful for some purposes, for example, industrial uses and warehousing, no tractor hitch of the self-engaging type has been produced which is suitable for the exacting and varied requirements of farm use. More specifically, there has been a need for a hitch suitable for attachment to a light farm tractor having power elevated draft links and which is adapted for coupling to various farm implements of the forwardly overbalanced type such as manure spreaders, trailers and the like. Any hitch for this service should fully utilize the advantages inherent in the tractor power lift device, should effect coupling with only a limited amount of movement of the hitch point, should enable a minimum radius of turn and should apply the draft force and gravity load to the tractor in a safe and efficient manner.

Also of considerable importance is the provision of locking means to prevent the connected implement from becoming disengaged due to upward whipping of the draft tongue particularly while traveling over rough terrain or (in the case of a manure spreader or trailer) with the implement lightly loaded. To prevent disengagement, various locking devices have been proposed, some of which enable the eye of the implement to be freely inserted into the hitch, a separate unlocking operation on the part of the operator being required before the parts can be disengaged. In the usual case this means that the operator of the tractor must leave his seat each time a load is dropped which is both time consuming and annoying.

Accordingly, one of the objects of the invention is to provide a hitch which is self-engaging and self-locking upon elevation of the draft linkage and self-releasing when the linkage is lowered, control of the entire hitching operation being thus accomplished merely by controlling the draft linkage. It is a related object to provide a hitch of the foregoing character which will produce an appreciable locking effect as incident to a limited amount of elevation of the coupling point, rendering additional locking or latching means unnecessary.

Another object is to provide an improved hitch of the above-mentioned type which is particularly well adapted for use with a forwardly overbalanced trailer, having a hitch point which is extremely close to the ground prior to the coupling operation and when the draft links are in their lowered position, and in which the hitch point is elevated substantially into the direct line of draft after coupling and when the draft links are in their raised position.

A further object of the invention is to provide hitch assembly of improved construction which is adapted to be readily attached to the draft links of a tractor equipped with the Ferguson system and without altering them in any way.

Still another object of the invention is to provide a hitch assembly for attachment to a pair of tractor draft links in a manner producing extremely close coupling between the tractor and towed implement and which at the same time eliminates the possibility of interference between the implement tongue and either one of the draft links upon the making of sharp turns. In one of its aspects it is an object of the invention to provide a close coupled hitch of the above type which enables access to the tractor power takeoff generally centered between the links.

Another object is to provide a hitch assembly which is simple, light in weight, and exceptionally strong, the last characteristic being due in large measure to a unitary construction employing substantially axially loaded compression members for shortening the unsupported span of a transverse drawbar.

Further objects and advantages of the invention will become apparent as the following description proceeds, taken in connection with the accompanying drawings in which.

Figure 1:
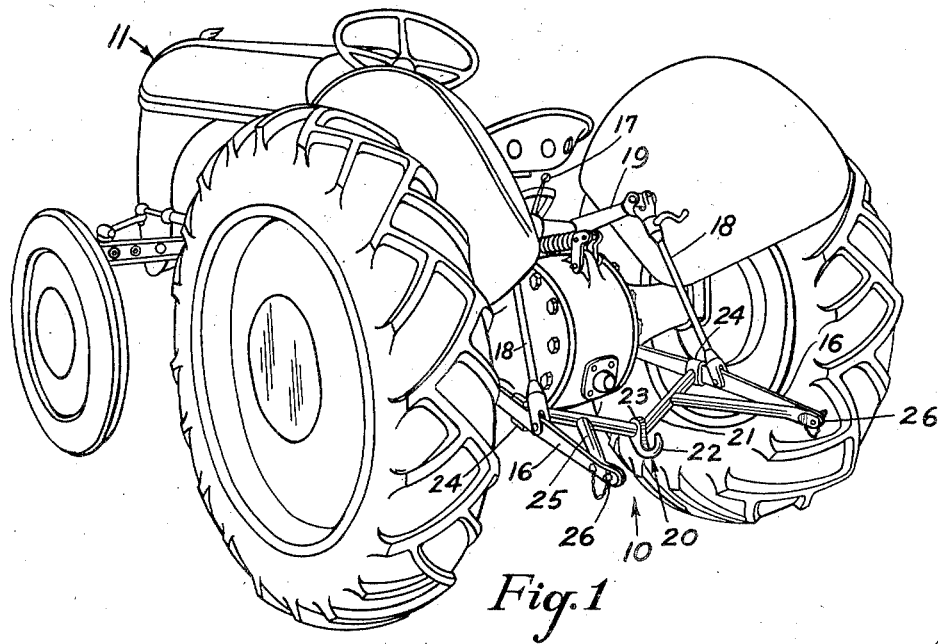
Figure 1 is a general perspective view showing a hitch embodying the invention and mounted on the lower draft links of a tractor employing the standard Ferguson system.

While the invention is susceptible of various modifications and alternative constructions, only the preferred embodiment has been shown in the drawings and will be herein described in detail, but it is to be understood that the intention is not to limit the invention to the specific form disclosed, but rather to cover all modifications and alternative constructions falling within the spirit and scope of the invention as expressed in the appended claims.

Referring to the drawings, an exemplary hitch constructed in accordance with the invention is indicated generally at 10, being used for coupling a tractor 11 of well known type to an implement 12, which may be a manure spreader, trailer or the like. The implement, in connection with which the invention will be discussed, is of the forwardly overbalanced type, having a hitching eye 14 and being supported upon a single pair of wheels (not shown) located well to the rear of the implement. A simple stand 15 is conventionally mounted under the draft tongue for supporting the overbalanced end of the trailer. However, during the course of the coupling operation, the hitch assumes the overbalanced component of the load, transferring it to the rear wheels of the tractor.

A mechanism with which the present invention is particularly well adapted to cooperate is the linkage of the draft system disclosed in some detail in Henry George Ferguson Patent 2,118,180 which issued on May 24, 1938. For present purposes it will suffice to say that such system includes a pair of lower draft links 16 trailingly pivoted at 16a to the rear axle housing of tractor 11 and below and slightly forward of the center line thereof. The draft links are vertically positioned by a pair of drop links 18 which are connected to hydraulically operated crank arms 19. Movement of a quadrant control lever 17 from one to the other of its extreme positions is effective to control internal hydraulic mechanism (not shown) causing rotation of the cranks 19 and vertical swinging of draft links 16.

In accordance with one aspect of the invention means are provided for mounting a draft connection on the trailing tractor links 16 in an improved manner which enables an implement not only to be closely coupled to the tractor but which results in a very limited amount of vertical movement of the hitch point as an incident to the draft links moving through their entire range of vertical movement and to the fully upraised position. In the present instance the draft connection includes a hook 20 mounted on a transverse drawbar 21 which spans the links 16 considerably forward of their ends. The hook 20 is characterized particularly by an upwardly extending finger portion 22, which is only slightly less in diameter than the internal diameter of the companion eye in an implement draft tongue and which may be formed by a reverse bend in a downwardly extending piece 23 welded or otherwise fixed to the drawbar. If desired, the portion 22 may merely consist of an upright peg or projection carried by the drawbar and adapted to be inserted in the eye of an implement tongue.

Mounting the drawbar forwardly of the drop links 18 and in a position in which it just clears the rear end housing of the tractor as shown in the drawing, in addition to producing close coupling, causes the total vertical movement of the hitch point during the coupling operation to be only a fraction of what it would if the hitch point were located at the end of the links in the conventional manner, thereby causing a minimum of tilting of the implement during the coupling operation and deriving a maximum mechanical advantage.

In accordance with another aspect of the invention the hitch point is substantially underslung with respect to the level of the links. In the present embodiment this is accomplished not merely by suspending the hook itself below the level of the links, but by forming the drawbar so that the latter is concaved and extends downwardly substantially to the root of the hook. Mounting the hook offset downwardly at this level insures that, with the link 16 lowered, the upper end of the finger portion 22 will be sufficiently low to clear the draft tongues of forwardly overbalanced implements of the type illustrated. This enables the tractor to be maneuvered into position to effect coupling of the implement without the necessity of the tractor operator leaving his position. Mounting the hitch point in the position shown has additional advantages which will be more clearly appreciated after further reference to the exemplary structure.

In the preferred embodiment the drawbar is formed of a steel beam depressed at its center in shallow V formation. The ends of the drawbar may, if desired, be clamped to the body portion of the draft links. I prefer, however, to mount the drawbar on the links in a manner which does not allow draft force to be exerted along the latter and to provide compression members for transmitting the draft force rearwardly to the respective ends of the draft links. To this end I provide a sliding type of engagement at the ends of the drawbar although it will be understood that no relative sliding movement actually takes place between the members. Specifically, ends of the drawbar include feet 24 in the form of outwardly facing C-shaped jaws to prevent movement of the drawbar relative to the plane of the links 16. For the purpose of transmitting the draft load from the drawbar 21 to the ends of the draft links, compression members 25 are used. Although these are shown as formed from tubing, lengths of "angle iron" or flat bar stock could be used equally well. At their forward ends the compression members 25 are attached to the underslung body portion of the drawbar 21, one on either side of the hook 20. From such forward point of attachment, the members 25 extend rearwardly and upwardly into contact with the ends of the draft links, being there detachably fixed in position by conventional pivot pins 26. The bracing afforded by the compression members 25 not only prevents the underslung drawbar 21 from swinging rearwardly upon application of draft load, but connection of such compression members along the body portion of the drawbar reduces the length of the unsupported span thereby permitting it to assume a much greater degree of horizontal and vertical loading than would otherwise be possible.

While the primary function of the members 25 is to exert an axial thrust, my invention also contemplates that the members 25 be utilized to maintain the assembly consisting of the hitch attachment 10 and the draft links 16 in rigid unitary engagement under all conditions. It will be appreciated by one skilled in the art that the links 16 are not restricted to purely vertical swinging movement but may also swing laterally through a limited arc. Such lateral swinging is undesirable for present purposes, the difficulty being aggravated by the fact that the compression members 25, under load, apply a component of force which tends to produce spreading of the links and thus disengagement of the jaws 24 at the ends of the drawbar. I have found that any such tendency may be overcome by orienting the compression members 25 so that they have considerable rigidity in a lateral or generally horizontal direction; thus, if flat bar stock is used it should be arranged with its flat side facing substantially upwardly. Further, the forward end of the members 25 should be anchored as rigidly as possible, for example, by welding. Such structure eliminates the necessity for stabilizer links or ties of any sort between the links to hold them together. As a result the hook is openly accessible and the structure is of extreme simplicity and readily detachable. The members 25 have been found to provide a diagonal or cross-bracing effect which prevents lateral swinging of the links even when extremely sharp turns are made.

Figure 3:
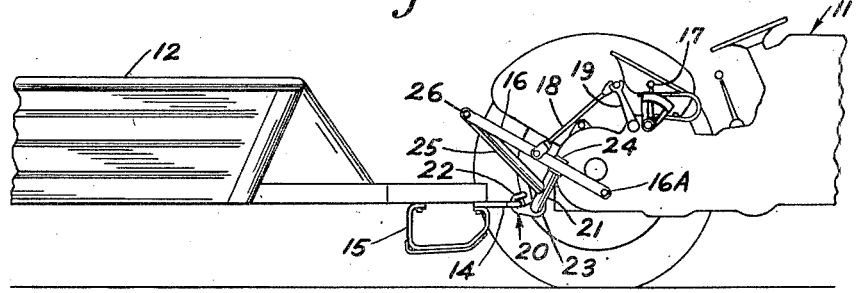
Fig. 3 shows the hitch of Fig. 2 in the coupled position.

It might be expected, with the draft links 16 raised to their upper limit position during transport conditions (Fig. 3) instead of being horizontally extended as is conventional, that the hydraulic lift mechanism including the drop links 18 would have to assume a considerable proportion of the draft load. As a matter of fact the amount of downward offset of the hook 20 from the point of attachment of the links is, in the improved hitch, very nearly equivalent to the distance that the hook is raised upon elevation of the links. As a result the hook is located, in operation, substantially on the normal draft line and little, if any, of the horizontal draft force exerted on the hook 20 is applied to the power lift elements. The latter can be readily appreciated by noting that pure draft loading would cause the draft links and the hitch assembly to assume the position illustrated in Fig. 3 even if the drop links 18 were not connected. Thus sudden jars, caused, for example, by the implement hitting an obstruction, produce little if any shock upon the hydraulic mechanism of the tractor.

It has already been stated that the hitch is well adapted for drawing a manure spreader. It is similarly well adapted for drawing any implement which requires an extremely short turning radius and which may, when fully loaded, impose a considerable downward thrust on the hitch point. The advantage of the present arrangement may conveniently be discussed from both of the standpoints alluded to. First, and with regard to turning radius, it well be noted that the hitch point is closely adjacent the rear axle housing. Of equal or greater importance, however, is the fact that the draft links 16 are sharply up-angled during transport conditions. As will be apparent from Fig. 3, this removes all lateral obstruction to the swinging of the tongue of the connected implement, and the latter may swing freely below the upraised draft links. Consequently, it is perfectly feasible to obtain a turning angle much greater than is possible in conventional hitches designed for close coupling, such angle being limited only by contact of the implement tongue with the rear wheels of the tractor. Tests on the setup disclosed in the drawing have showed that a turning angle of 65° may be achieved resulting in a turning radius of only 16½ feet.

Discussing the arrangement next with regard to downward thrust on the hitch connection, it must be kept in mind that the tractor is of the so-called lightweight type and that it is extremely desirable to minimize any tendency toward lifting of the front wheels. In addition, the downward force which may be applied at the outermost ends of the draft links is limited by the load lifting capacity of the system. It is, therefore, important to note that the extremely close coupling achieved in my self-engaging hitch brings the downward force more nearly into vertical alignment with the rear axle, thus reducing by a large factor any tendency of the tractor to "rear" due to decreased pressure on the front wheels. The improved hitch constructed as shown will withstand a vertical loading substantially twice that of a hitch located at the ends of the draft links. The capability of the tractor in vertical loading is thus approximately doubled, enabling forwardly overbalanced two-wheeled implements to be used in cases where it has been considered essential to use four wheels to support the load.

While the present structure effects close coupling of a self-engaging hitch in a novel and effective manner, and enables the hitch point to be elevated substantially to the direct line of draft during transport, it must be recognized that ordinary types of drawbars would, under such circumstances, block off or seriously interfere with the use of the tractor power take-off which, in the type of tractor illustrated, is located between and somewhat above the point of connection of the lower links. The preferred concave or V formation of the drawbar enables access under normal conditions of link elevation and greatly increases the number of implements with which the hitch may be used. There is another and related advantage of the downwardly concaved drawbar which deserves mention and which will be apparent from Fig. 3. As the drawbar is raised, it rocks rearwardly about the pivot points of the lower links and comes into nested registry with the rearwardly bulging differential housing and which would tend otherwise to limit the rearward movement of the drawbar.

Figure 4:
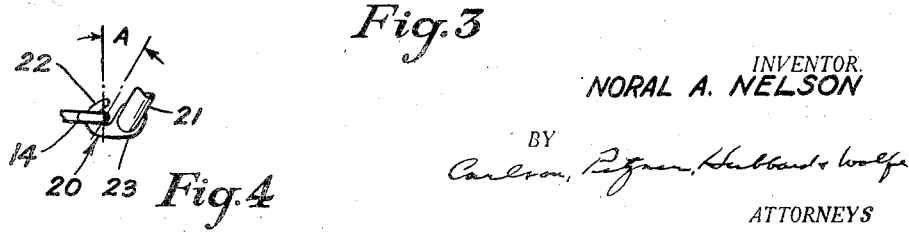
Fig. 4 is a fragmentary enlarged view of the hook portion of the hitch shown in Figs. 1–3 and with the eye of implement tongue in engagement therewith.

In accordance with one of the principal objects of the invention, the coupling hook 20 is so constructed and so angled with respect to the draft links and so located with respect to the point of pivoting of the latter as to provide appreciable locking action as an incident to raising the hitch to its transport position. By the term "locking action" is meant the effecting of relative movement of the hook with respect to the eye of the implement draft tongue so that the latter cannot be displaced from the hook simply by upward movement of the tongue which may, for example, be caused by rebound or upward whipping of the tongue when the implement is passing over rough ground. In the present instance such locking has been accomplished by mounting the hook 20 within a very short distance of the pivot axis 16a about which it rocks and further by providing an elongated finger portion 22 on the hook which is generally vertical with the links 16 in their lowered position but which rocks, upon raising the links, into a position in which it projects forwardly. Under such conditions the finger overlies the implement eye 14 which encircles the finger portion 22 of the hook during transport. The relationship is more clearly shown in the fragmentary enlarged view of Fig. 4 where the finger 22 will be noted to be forwardly inclined at an appreciable angle A making it impossible to lift the eye out of the hook by applying purely vertical movement thereto.

In the conventional pin and eye arrangement employed on farm implements the large internal diameter of the eye causes considerable play between the pin and the eye. Here, however, such play is eliminated by reason of the engagement of the bent portion or root of the hook with the eye upon the relative rocking movement therebetween during engagement. Therefore, it is almost impossible for the eye 14 to escape when the hook is upraised and during transport because it requires that the eye rock forwardly as well as upwardly relatively to the hook, which movement is scarcely possible. As a practical matter, with the finger 22 projecting forwardly at an angle A of approximately 48°, it has been found that there is substantially no danger of the implement eye escaping even under the most adverse conditions, and it is completely unnecessary to provide a latching tab or separate lock of any sort. Such structure is contrasted with prior art hitches of the self-engaging type in which any incidental change in forward angling of a hook member is wholly inadequate for locking purposes. The present device is also contrasted with hitches in which considerable play occurs within the implement eye under transport conditions, and those in which separate locking devices of one sort or another must be used.

It will be apparent to one skilled in the art that the invention, in one of its broader aspects, is by no means limited to use with a pair of draft links but obviously includes the concept of mounting the hook 20 or its equivalent on any suitable rigid bracket suspended below a single trailing draft link, the latter being alined with the center line of the vehicle. Such structure would not be as satisfactory, however, as that disclosed since it would be considerably less rigid in resisting lateral forces encountered during the making of sharp turns.

Figure 2:
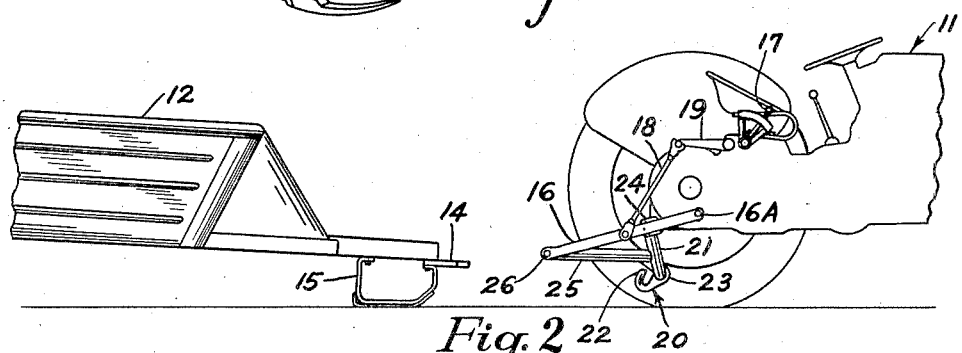
Fig. 2 is a schematic view showing a tractor equipped with a hitch constructed in accordance with the present invention and in position to receive the towed end of a forwardly overbalanced implement.

While the operation of the improved hitch will be generally understood from the foregoing, it will be helpful in conclusion to outline it briefly. Prior to coupling a load, the hitch is lowered as shown in Fig. 2, the finger portion 22 of the hook 20 projecting generally upwardly but lying below the level of the eye 14 of the implement tongue. The tractor is maneuvered into a position in which the finger portion 22 of the hook is approximately centered within the eye 14. The quadrant lever 17 is then operated causing the internal hydraulic mechanism to rotate the cranks 19 and to elevate the draft links 16 into the position shown in Fig. 3. As an incident to such elevation, the finger portion 22 of the hook 20 engages the eye 14 and upon continued movement thereof rocks forwardly, in effect closing the hook and preventing escape of the eye. After the implement has been towed to the desired location it is sufficient merely to operate the quadrant lever 17 to effect simultaneous unlocking and lowering of the hook into the position shown in Fig. 2 and without requiring the driver to dismount.

I claim as my invention:

1. A hitch for attachment to a tractor having a pair of draft links trailingly pivoted on the rear end portion thereof and having a power lift mechanism for elevating the same, said hitch comprising, in combination, a transverse drawbar arranged to span the draft links forward of the trailing ends thereof, and having a central underslung portion, mounting feet attached to the ends of said drawbar and adapted to prevent movement of said drawbar relative to the plane of the links, a hook centrally mounted on the underslung portion of said drawbar and including a substantially upright finger portion for engaging an eye on the draft tongue of a coupled implement, and a pair of rearwardly diverging and upwardly extending compression members rigidly attached at their forward ends to said drawbar and detachably connectible at their rearmost ends to the trailing ends respectively of the draft links for transferring the draft load from said drawbar to the draft links.

2. A hitch mechanism for attachment to a tractor having on its rear end portion a pair of trailingly pivoted draft links elevated by power lift means and for coupling to the draft tongue of a forwardly overbalanced implement, said hitch mechanism comprising, in combination, a drawbar having means thereon for detachably mounting the same on the draft links, a generally upwardly extending finger member mounted on said drawbar and adapted to engage the draft tongue upon upward movement of the links, said finger member being mounted forwardly of the trailing ends of the draft links so that it is subjected to appreciable forward rocking movement upon raising of the links and rearward rocking movement upon lowering the same as incident to limited vertical movement thereof.

3. A hitch for attachment to a tractor having a draft link trailingly pivoted on the rear end portion thereof and having a power lift mechanism for elevating the same, said hitch comprising, in combination, a hook detachably mountable on the draft link and having an upwardly extending finger portion for insertion into the eye on the draft tongue of a coupled implement, said finger portion being so arranged with respect to the link that elevation of the draft link to its extreme upward position causes said finger portion to project forwardly in order to prevent the implement draft tongue from being uncoupled from said hook by purely upward movement thereof.

4. A hitch for attachment to a tractor having a pair of power elevated draft links trailingly pivoted on the rear end portion thereof comprising, in combination, a transverse drawbar arranged to span the draft links, a draft connection on said drawbar for coupling an implement tongue thereto, means for rigidly mounting said drawbar on the body portion of the links and closely adjacent the rear end portion of the tractor, said draft connection being located below the plane of the links to enable free lateral swinging of the implement tongue under the draft links during transport and with the latter in the upraised position.

5. A hitch for attachment to a tractor having a pair of draft links trailingly pivoted on the rear end portion thereof and having a power lift mechanism for elevating the same, said hitch comprising, in combination, a transverse drawbar adapted to be detachably mounted on the draft links, a hook centrally mounted on said drawbar and having an upwardly extending finger portion for insertion into the eye on the draft tongue of a coupled implement, said finger portion being so arranged that elevation of the draft links to their extreme upward position for transport causes said finger portion to project forwardly, said hook having a narrow root portion adapted to angularly engage the implement eye to prevent the implement draft tongue from being uncoupled from said hook by purely upward movement thereon during conditions of transport.

6. A self-engaging hitch for attachment to a tractor having a pair of draft links trailingly pivoted on the rear end portion thereof and having a power lift mechanism for elevating the same, said hitch comprising, in combination, a transverse drawbar adapted for detachable mounting on the draft links forwardly of the trailing ends thereof, a hook mounted on said drawbar and including an upstanding portion for insertion into an eye on the draft tongue of a coupled implement upon elevation of the links, and compression members disposed between said drawbar and the trailing ends of the draft links for transferring the draft load from said drawbar to the draft links.

7. A hitch for attachment to a tractor having a pair of power-elevated draft links trailingly pivoted on the rear end portion thereof comprising, in combination, a transverse drawbar detachably mountable on the draft links forward of the trailing ends thereof, mounting feet attached to the ends of said drawbar and each having surfaces thereon adapted to abuttingly engage both the inner surface and upper and lower edges of respective ones of the draft links, a hook centrally mounted on said drawbar and including a finger portion for engaging an eye on the draft tongue of a coupled implement, and a pair of rearwardly diverging compression members rigidly attached at their forward ends to said drawbar and detachably connectable at their rearward ends to the trailing ends of the draft links for transferring the draft load from said drawbar to the draft links.

8. In a hitch mechanism for attaching to a tractor a forwardly overbalanced trailer with a transfer of the unbalanced trailer load to the tractor, the latter including a pair of draft links trailingly pivoted on the rear end portion thereof, the combination of a transverse drawbar adapted for mounting on the draft links forwardly of the trailing ends thereof and having an underslung central portion, a draft connection on said central portion, a pair of rearwardly diverging compression members disposed between said drawbar and the trailing ends of the draft links for transferring the draft load from said drawbar to the draft links.

9. In a hitch for attachment to a tractor having a pair of draft links trailingly pivoted on the rear end portion thereof, the combination of a transverse drawbar adapted to be detachably mounted on the draft links forwardly of the trailing ends thereof and having a downwardly extending intermediate portion, a hook mounted on said downwardly extending intermediate portion of said drawbar for engagement with an eye on the draft tongue of a coupled implement, and a pair of upwardly and outwardly extending compression members disposed between the intermediate portion of said drawbar and the trailing ends of the draft links for transferring the draft load from said drawbar to the draft links.

10. In a self-engaging mechanism for coupling to a tractor the eye on the draft tongue of a forwardly overbalanced trailer with a transfer of the unbalanced trailer weight to the tractor, the latter including a pair of power-elevated draft links trailingly pivoted on the rear end portion thereof, the combination comprising a transverse drawbar detachably mounted on said draft links forwardly of the trailing ends thereof and having a downwardly-concaved body portion, a hook mounted centrally on said body portion and having an upwardly extending finger portion for insertion into the eye on the draft tongue of said trailer, a pair of upwardly and outwardly extending compression members having their forward ends attached to the body portion of said drawbar between the ends of the drawbar and said hook and having their rear ends detachably connectible to the trailing ends of said draft links respectively for transferring substantially all of the draft load from said drawbar to said draft links.

11. A close coupled self-engaging hitch for attachment to a tractor having a pair of draft links trailingly pivoted on the rear end portion thereof and having a power lift mechanism for elevating the same, said hitch comprising, in combination, an underslung drawbar in the form of a shallow V and detachably mounted transversely on the draft links forward of the trailing ends thereof with the apex of the V extending downwardly, mounting feet unitary with the ends of said drawbar and each having a C-shaped channel therein adapted to snugly engage the body portion of respective ones of the said draft links, a hook centrally mounted on said drawbar and having an upwardly extending finger portion defining a notch for close engagement with an eye on the draft tongue of a coupled implement upon elevation of the draft links, and a pair of rearwardly diverging and upwardly extending compression members having their forward ends rigidly attached to said drawbar at intermediate points thereon and having their rearmost ends adapted to be detachably pinned to the trailing ends of the draft links for transferring substantially all of the draft load from said drawbar to the draft links under transport conditions.

12. A hitch for attachment to a tractor having a pair of power-elevated draft links trailingly pivoted on the rear end portion thereof adjacent the differential housing and having a power takeoff projecting rearwardly from said housing, said hitch comprising, in combination, a transverse drawbar arranged to span the draft links, means for mounting said drawbar on the draft links closely adjacent said differential housing, said drawbar having an offset central portion which extends downwardly when the links are in their fully lowered positions but which upon elevation of the links is adapted to nestingly register with said differential housing while still permitting access to the power takeoff.

13. A hitch for attachment to a tractor having a pair of power elevated draft links trailingly pivoted on the rear end portion thereof and having substantial freedom for lateral swinging movement, said hitch comprising, in combination, a transverse drawbar detachably mounted on the draft links forwardly of the trailing ends thereof, feet attached to the ends of said drawbar and having shallow C-shaped channels each adapted to straddle the body portion of one of the draft links, a pair of rearwardly diverging compression members disposed between said drawbar and the trailing ends of the draft links for transferring the draft load from said drawbar to the draft links, said compression members being rigidly secured to said drawbar and having sufficient rigidity in a lateral direction to resist the tendency for the draft links to spread apart as a result of the diverging arrangement of said compression members.

14. A hitch for attachment to a tractor having a pair of draft links trailingly pivoted on the rear end portion thereof and having a power lift mechanism including drop links for elevating the same, said hitch comprising, in combination, an underslung transverse drawbar adapted for rigid mounting on the draft links, a coupling member centrally mounted on said underslung drawbar for engaging the draft tongue of a coupled implement, said coupling member being spaced below the plane of the draft links by an amount such that elevation of the draft links to the upraised position for transport causes elevation of said coupling member to substantially the pivot level of the draft links so that the forces existing in the drop links and hydraulic mechanism are substantially unaffected by changes in the force of draft.

15. A hitch for attachment to a tractor having a pair of draft links trailingly pivoted on the rear end portion thereof and having a power lift mechanism for elevating the same, said hitch comprising, in combination, an underslung transverse drawbar detachably mountable on the draft links forward of the trailing ends thereof, a hook centrally mounted on said underslung drawbar for engaging an eye on the draft tongue of a coupled implement and raising said eye into the line of draft upon elevation of the draft links, compression members disposed between said drawbar and the trailing ends of the draft links for transferring the draft load from said drawbar to the draft links, said compression members being so arranged as to be raised well clear of the implement draft tongue as an incident to the elevation of the draft links, leaving the draft tongue free to swing about a vertical axis from one rear wheel of the tractor to the other to the end that the tractor and the coupled implement have an extremely short turning radius.

16. A hitch for attachment to a tractor having a pair of power elevated draft links trailingly pivoted on the rear end portion thereof and comprising, in combination, a draft coupling member mounted forward of the trailing ends of the links, means for detachably connecting said coupling member to the draft links for vertical swinging movement therewith between a lowered and an upraised position, said coupling member when connected to the links being located below the plane of the same for permitting free lateral swinging of an implement tongue under the draft links with the latter in the upraised position.

17. A hitch for attachment to a tractor having a pair of draft links trailingly pivoted on the rear end portion thereof and having a power lift mechanism for elevating the same, said hitch comprising, in combination, a hook mounted for vertical swinging movement in response to such movement of the draft links, said hook being adapted to engage an eye on the draft tongue of a coupled implement and to raise the eye into the line of draft upon elevation of the draft links, a transverse bar rigidly connected to said hook, connecting members disposed between said transverse bar and the trailing ends of the draft links, said connecting members being so arranged as to be raised well clear of the implement draft tongue as an incident to the elevation of the draft links thus permitting free lateral swinging movement of the draft tongue between the rear wheels of the tractor.

18. A self-engaging hitch for attachment to a tractor having a pair of draft links trailingly pivoted on the rear end portion thereof and having a power lift mechanism for elevating the same, said hitch comprising, in combination, a hook mounted for vertical swinging movement along with the draft links, said hook including an upstanding portion for insertion into the eye of the draft tongue on a coupled implement upon elevation of the draft links, a transverse bar integral with said hook, and rearwardly diverging strut members disposed between said transverse bar and the trailing ends of the draft links.

19. A hitch for attachment to a tractor having a pair of power elevated draft links trailingly pivoted on the rear end portion thereof adjacent the differential housing and having a power take-off projecting rearwardly from said housing, said hitch comprising the combination of a coupling member adapted to engage the draft tongue of a towed implement, laterally spaced connecting members between said coupling member and the draft links for rendering said coupling member vertically movable in response to vertical swinging movement of the draft links, said connecting members being constructed and arranged so as to bring said coupling member into the immediate vicinity of the power takeoff upon substantially full elevation of the draft links without blocking access to the power takeoff.

20. A hitch for attachment to a tractor having a pair of draft links trailingly pivoted on the rear end portion thereof and having a power lift mechanism for the same, said hitch comprising, in combination, a centrally mounted coupling member for engaging the draft tongue of a coupled implement, and rearwardly diverging connecting members between said coupling member and the draft links, said coupling member being spaced below the plane of the links by an amount such that elevation of the latter to an upraised position for transport causes elevation of said coupling member to substantially the pivot level of the draft links.

NORAL A. NELSON.

REFERENCES CITED

The following references are of record in the file of this patent:

UNITED STATES PATENTS

| Number | Name | Date |
| --- | --- | --- |
| 2,210,907 | Erickson | Aug. 13, 1940 |
| 2,223,002 | Ferguson | Nov. 26, 1940 |
| 2,320,168 | Benjamin et al. | May 25, 1943 |
| 2,392,903 | Currie | Jan. 15, 1946 |